United States Patent [19]
Toda

[11] Patent Number: 4,789,510
[45] Date of Patent: Dec. 6, 1988

[54] PROCESS FOR PRODUCING A SHAPED, SINTERED MAGNESIA ARTICLE HAVING AN ENHANCED RESISTANCE TO HYDRATION AND AN IMPROVED MECHANICAL STRENGTH

[75] Inventor: Yasuhiko Toda, Ube, Japan

[73] Assignee: Ube Industries, Ltd., Yamaguchi, Japan

[21] Appl. No.: 55,169

[22] Filed: May 28, 1987

[30] Foreign Application Priority Data

Jun. 3, 1986 [JP] Japan ................................. 61-127373

[51] Int. Cl.$^4$ ............................................. C04B 35/04
[52] U.S. Cl. ..................... 264/60; 501/109; 501/122
[58] Field of Search .................. 501/122, 109; 264/60

[56] References Cited

FOREIGN PATENT DOCUMENTS 1481370 5/1967 France ................................. 501/122
58-181764 10/1983 Japan ................................... 501/122
2153814 8/1985 United Kingdom .

Primary Examiner—James Derrington
Attorney, Agent, or Firm—Burgess, Ryan & Wayne

[57] ABSTRACT

A shaped, sintered magnesia article having an enhanced hydration resistance and an improved mechanical strength is produced by evenly coating fine individual magnesia particles with silica coating layers containing an organic substance in an amount of 0.01% or less in terms of carbon, based on the molar amount of silicon in the silica coating layers; by shaping the silica-coated magnesia particles into a predetermined form; and by sintering the resultant shaped silica-coated magnesia particle article at an elevated temperature to an extent such that the silica coating layers are converted to corresponding forsterite coating layers.

10 Claims, No Drawings

PROCESS FOR PRODUCING A SHAPED, SINTERED MAGNESIA ARTICLE HAVING AN ENHANCED RESISTANCE TO HYDRATION AND AN IMPROVED MECHANICAL STRENGTH

BACKGROUND OF THE INVENTION

1. Field of the Invention

The present invention relates to a process for producing a shaped, sintered magnesia article having an enhanced resistance to hydration and an improved mechanical strength. More particularly, the present invention relates to a process for producing a shaped, sintered magnesia article consisting essentially of fine magnesia particles each uniformly coated with a forsterite coating layer and firmly bonded to each other, and thus having an enhanced resistance to hydration, a high density which is substantially similar to a theoretical density thereof, and an improved mechanical strength.

2. Description of the Related Art

It is well known that magnesia exhibits excellent physical properties, for example, a high melting point of about 2800° C., an excellent electrical insulating property, and a high heat transmission property. It is also known that sintered high density magnesia articles exhibit a high transmission of infrared rays and visible lights. Due to the above-mentioned properties, attempts have been made to utilize the intered magnesia articles as high temperature insulating materials, high temperature illumination materials, or IC base plate materials.

However, in industrial usage, the sintered magnesia articles are practical only for restricted usages of, for example, crucibles and protecting tubes for thermocouples. This restriction is imposed because the sintered magnesia articles exhibit a poor resistance to hydration. That is, magnesia (magnesium oxide) is easily hydrated in the ambient air atmosphere, and thus is converted to magnesium hydroxide, which exhibits poorer physical properties than those of magnesia.

In order to enhance the resistance of magnesia to hydration, the following processes have been disclosed.

(1) A magnesia powder is mixed with an additional powder consisting of at least one member selected from calcium magnesium phosphate, magnesium phosphate, and silica powders by mechanical mixing under a dry condition or in a proper solvent, the resultant magnesia mixture is shaped into a desired form, and the resultant shaped magnesia mixture article is sintered at an elevated temperature.

However, this process (1) is disadvantageous in that the resultant shaped, sintered magnesia article exhibits an unsatisfactory resistance to hydration, a uniform mixing of the magnesia powder with the additional powder is very difficult, and the uneven mixture causes an undesirable irregular growth of the particles in the sintering step. Therefore, the resultant sintered article exhibits unsatisfactory thermal and mechanical properties.

(2) Japanese Unexamined Patent Publication (Kokai) No. 58-217,480 discloses another process in which a shaped magnesia article is preliminarily sintered at a temperature of from 900° C. to 1100° C., the resultant porous article is impregnated with a solution of an organic silicate compound, the organic silicate compound in the preliminarily sintered porous magnesia article is burnt to form a very fine silica particle layer on the magnesia article, and the resultant article is sintered at a high temperature of about 1400° C., to allow the very fine silica particles to react with magnesia and thus to provide a forsterite coating layer on the magnesia article.

This process (2) is disadvantageous in that the procedures in the process are very complicated, the amount of the forsterite coating layers to be formed on the magnesia particles cannot be easily adjusted to a desired level, and the resultant forsterite coating layers are formed unevenly on the magnesia particles. Therefore, in this process (2), it is necessary to produce the forsterite coating layers in an excessively large amount, to completely coat the shaped magnesia article. This large amount of the forsterite coating layers causes an undesirably reduced heat transmission of the resultant shaped, sintered magnesia article.

(3) Japanese Unexamined Patent Publication (Kokai) No. 60-166,260 discloses a process in which a magnesia powder is mixed with a solution of an organic silicate compound, the resultant magnesia mixture is shaped into a desired form, and the shaped magnesia mixture article is sintered so that the organic silicate compound is converted to silica and the magnesia reacts with the silica to deposit the resultant forsterite on the surfaces of the individual magnesia particles.

In this process (3), after the magnesia powder is mixed with the organic silicate compound solution, the resultant dispersion must be filtered and dried, and the resultant dried mixture, which is in the form of grains, must be milled or pulverized. These steps complicate the process (3), and the resultant mixture powder is contaminated with inevitable impurities. Also, the organic substances in a large amount covering the individual magnesia particle surfaces hinder a close bonding of the magnesia particles with each other. Therefore, it is difficult to obtain a sintered magnesia article having a high density. Furthermore, in the process (3), it is difficult to adjust the amount of the forsterite coating layers on the magnesia particles to a desired level.

SUMMARY OF THE INVENTION

An object of the present invention is to provide a process for producing a shaped, sintered magnesia article having an enhanced resistance to hydration and an improved mechanical strength.

Another object of the present invention is to provide a process for producing a shaped, sintered magnesia article having a high density, by easy operations.

The above-mentioned objects can be attained by the process of the present invention which comprises the steps of: preparing coated fine magnesia particles each consisting essentially of fine individual particles uniformly coated with a silica layer containing 0.01% or less of organic substances in terms of carbon therein, based on the molar amount of silicon in the silica coating layer; shaping the coated magnesia particles into a predetermined form of a precursory magnesia article, and sintering the resultant shaped precursory magnesia article at an elevated temperature to an extent such that the silica coating layer is converted to a corresponding forsterite coating layer.

DESCRIPTION OF THE PREFERRED EMBODIMENTS

The process of the present invention comprises the first step in which coated fine magnesia particles each consisting essentially of a fine individual magnesia particle evenly coated by a thin silica layer containing organic substances in a restricted amount of 0.01% or less in terms of carbon in the organic substances, based on the molar amount of silicon in the silica coating layer, is prepared; the second step in which the resultant silica-coated fine magnesia particles are shaped into a predetermined form to provide a precursory magnesia article; and the third step in which the resultant precursory magnesia article is sintered at an elevated temperature to an extent such that the thin silica coating layer on the fine magnesia particle is converted to a corresponding thin forsterite coating layer.

Preferably, the individual magnesia particles to be subjected to the first step of the process of the present invention are those prepared by oxidizing a vapor of metallic magnesium with a molecular oxygen-containing gas by a vapor phase oxidation reaction. The gas phase oxidation reaction product comprises primary magnesia particles which are substantially free from agglomeration thereof. Also, in the first step, the silica coating layer ($SiO_2$) is preferably formed in an amount of 0.1 to 10 molar % based on the molar amount of the silica coated fine magnesia particle ($MgO + SiO_2$).

In the first step, the silica-coated fine magnesia particles can be produced by bringing the fine magnesia particles into contact with a vapor of an organic silicate compound at an elevated temperature, to uniformly form silica coating layers on the surfaces of fine individual magnesia particles.

For example, the contact of the fine magnesia particles with the organic silicate compound vapor is effected by fluidizing the fine magnesia particles in a fluidizing gas stream containing the organic silicate compound vapor at a temperature of from 300° C. to 600° C., preferably, from 350° C. to 450° C., in a gas-solid phase reaction vessel.

Preferably, the fluidizing gas stream formed in the gas-solid phase reaction vessel contains 1 to 20 molar %, more preferably, 4 to 8 molar % of the organic silicate compound vapor. Also preferably the fluidizing gas stream contains water vapor in a molar amount of 0.1 to 20 times that of the organic silicate compound, in addition to the organic silicate compound vapor. The fluidizing gas stream may contain a carrier gas consisting of at least one member selected from air, nitrogen gas and argon gas.

In the first step, the organic silicate compound is preferably selected from tetraethoxysilane, methyltriethoxysilane, ethyl-triethoxysilane, trimethylmethoxysilane, trimethylethoxysilane, dimethyldimethoxysilane, dimethyldiethoxysilane, methyltriethoxysilane, methyldimethoxysilane, methyldiethoxysilane, and dimethylethoxysilane.

When the organic silicate compound vapor comes into contact with the surface of the magnesia particle at the elevated temperature, the organic silicate compound is decomposed or hydrolyzed and the resultant active silicate radical complex is chemically absorbed in active portions in the magnesia particle surface, or the organic silicate compound reacts with hydroxy radicals (—OH) remaining in the magnesia particle surface portion by a condensation reaction so that a silica polymer containing a certain amount of organic substances is deposited on the surface of the magnesia particle. The deposited silica polymer layer is further decomposed at the elevated temperature and converted to a dense, uniform silica coating layer containing the organic substances in a very small amount of 0.01% or less in terms or carbon therein, based on the molar amount of silicon in the silicate coating layer.

The amount of the silica coating layer can be adjusted to a desired level by controlling the concentration of the organic silicate compound vapor in the reaction vessel and/or by controlling the reaction time of the magnesia particle with the organic silicate compound vapor.

In the first step of the process of the present invention, the fine individual magnesia particles, which have been produced by a gas phase oxidation reaction of magnesium vapor and are substantially free from agglomeration thereof, can be uniformly coated with a thin layer of silica.

When the magnesia particles are produced by heat decomposing magnesium hydroxide, basic magnesium carbonate, and/or magnesium carbonate, the resultant primary particles of magnesia exhibit a strong agglomerating property and are in the form of large secondary particles each consisting of an agglomerate of a plurality of the primary particles of the magnesia. When this type of magnesia secondary particles are subjected to the silicate deposition procedure, the resultant silica layer is formed on the secondary particles of the magnesia. Therefore, the surfaces of the fine primary individual particles of magnesia are unevenly coated by the silica layers. That is, it is very difficult to provide fine primary individual magnesia particles evenly coated by the silica layer and having a uniform sintering property.

Accordingly, in the process of the present invention, preferably the fine primary individual magnesia particles are produced by the gas phase oxidation reaction of magnesium vapor, and thus are separate from each other without agglomeration thereof. This type of magnesia particles can be evenly coated by the silicate coating layer in the first step of the process of the present invention, and undesirable irregular growth of the particles does not occur in the sintering step.

In the second step of the process of the present invention, the silica-coated magnesia particles are shaped into a predetermined form. The shaping of the silica-coated magnesia particles is not limited to a specific shaping method, but preferably, the shaping procedure is carried out by an isotropic press-shaping method under a pressure of 1 ton/cm² or more to provide a precursory shaped magnesia article.

In the third step of the process of the present invention, the precursory shaped magnesia article is sintered at an elevated temperature, preferably, from 1300° C. to 1700° C., to an extent such that the silica coating layer is converted to a corresponding forsterite coating layer. The resultant sintered article has a density close to a theoretical density thereof. In the sintering step, silica in the silica coating layer reacts with magnesia in the surface portion of the magnesia particle to produce forsterite ($Mg_2SiO_4$). The resultant forsterite coating layer exhibits an excellent resistance to hydration, whereas magnesia per se has a poor hydration resistance. Therefore, the magnesia particle is protected from hydration by the forsterite coating layer formed thereon.

In the conventional process, an organic silicon compound having a certain amount of an organic radical, for example, ethoxy radical, is absorbed in the magnesia particles, and the resultant particles are shaped and sintered when the absorbed organic silicon compound is decomposed in the sintering step. This decomposition of the organic silicon compound generates gaseous substances, and the generated gaseous substances hinder the firm bonding of the magnesia particles to each other in the sintering step. Accordingly, the resultant sintered article exhibits an unsatisfactory density.

In the process of the present invention, the silica coating layers on the magnesia particles contains organic substances in an extremely small amount of 0.01% or less in terms of carbon therein, based on the molar amount of silicon in the silica coating layer. Therefore, the amount of gaseous substances generated from the organic substances in the silica coating layer during the sintering step is extremely small or substantially zero and the silica-coated magnesia particles can be firmly bonded to each other without being affected by the decomposition products of the organic substances. The resultant sintered article from the process of the present invention exhibits a higher density and greater mechanical strength than those of a conventional sintered magnesia article which has been produced from magnesia particles without a silica coating layer.

The reasons for the above-mentioned high density and greater mechanical strength of the magnesia article are assumed to be as follows.

In the initial stage of the sintering step, the silica-rich coating layers on the magnesia particle surfaces promote a rearrangement of the particles in the shaped article, to increase the density of the shaped article. Further, in the middle and final stages of the sintering step, silica in the coating layers and magnesia in the surface portions of the magnesia particles diffuse into and react with each other to form forsterite coating layers. The above-mentioned diffusion and reaction promote the firm bonding of the particles to each other in the shaped article.

The mineral composition of the shaped, sintered magnesia article produced by the process of the present invention, and consisting essentially of magnesia and forsterite, can be confirmed by X-ray diffractometry. Also, the uniform forming of the forsterite coating layer on the interfaces of the fine individual magnesia particles in the sintered article can be conformed by the observation of the distribution conditions of silicon and magnesium in the sintered article by an X-ray microanalyzer.

The forsterite exhibits a low heat transmission corresponding to 1/10 that of magnesia. However, when the amount of the silica coating layers on the fine magnesia particles is limited to 10 molar % or less based on the total molar amount of the silica-coated magnesia particles, the resultant sintered, forsterite-coated magnesia article exhibits a similar heat transmission to that of a sintered pure magnesia article.

The higher the content of the silica coating layers in the silica-coated magnesia particles, the higher the hydration resistance of the resultant sintered, forsterite-coated magnesia article. However, when the content of the silica coating layer is 0.1 molar % or more, preferably 1 molar % or more, the resultant sintered, forsterite-coated magnesia article exhibits a satisfactorily enhanced resistance to hydration.

EXAMPLES

The present invention will be further illustrated by way of specific examples, which, however, are merely representative and do not restrict the scope of the present invention in any way.

In the examples, the following tests were carried out.

(1) Determination of relative density of the sintered article (2) Determination of resistance of the sintered article to hydration A sintered article was placed in an autoclave filled with water vapor at a temperature of 180° C. under a pressure of about 10 atmospheres, for one hour. The degree of hydration resistance of the sintered article was represented by the weight increase calculated in accordance with the following equation:

Weight increase (%) = $[(W - W_0)/W_0] \times 100$ wherein $W_0$ represented the original weight of the sintered article and W represented the weight of the article after the above-mentioned water vapor treatment. The weight increase is derived from the hydration of magnesia into magnesium hydroxide.

(3) Measurement of bending strength of the sintered article (4) Measurement of thermal conductivity of the sintered article

EXAMPLE 1

Magnesia particles were produced by the gas-phase oxidization of magnesium vapor at an elevated temperature of 1400° C. The resultant magnesia particles had an average size of 0.055 μm.

The magnesia particles in an amount of 100 g were introduced into a fluidized bed reactor and were fluidized therein by flowing a fluidizing air stream containing 7 molar % of tetraethoxysilane vapor at a feed rate of 3.9 l/min at a temperature of 400° C. for 15 minutes to uniformly coat the magnesia particles with silica coating layers.

The amount of the silica coating layers was 5.9 molar % based on the molar amount of the resultant silica-coated magnesia particles. The silica coating layers contained 0.01% of organic substances, in terms of carbon, based on the molar amount of silicon in the silica coating layers.

The silica-coated magnesia particles in an amount of 20 g were molded into a disk having a diameter of 40 mm and a thickness of 3 to 4 mm, by an isotropic press-shaing method, under a pressure of 3.0 tons/cm².

The resultant disk was sintered at a temperature of 1400° C. for one hour in the ambient air atmosphere to provide a sintered forsterite-coated magnesia particle disk.

It was confirmed by X-ray diffractometry that the silica in the silica-coating layers was completely converted to forsterite.

The disk exhibited the relative density, bending strength, thermal conductivity, and hydration resistance shown in Table 1.

COMPARATIVE EXAMPLE 1

The same procedures as those described in Example 1 were carried out except that the first step for coating the fine magnesia particles with silica was omitted.

The properties of the comparative sintered article are shown in Table 1.

COMPARATIVE EXAMPLE 2

The same magnesia particles having an average size of 0.055 μm as those described in Example 1 were mixed with 5.9 molar % of fine silica particles having an average size of 0.03 μm. The mixture was agitated in an agate mortar. The agitated mixture in an amount of 20 g was shaped and sintered in the same manner as that described in Example 1.

The properties of the resultant comparative sintered article are shown in Table 1.

COMPARATIVE EXAMPLE 3

The same magnesia particles having an average size of 0.055 μm as those described in Example 1 in an amount of 20 g were shaped in the same manner as that described in Example 1. The shaped article was pre-sintered at a temperature of 1100° C. for 6 hours. The pre-sintered magnesia article had a porosity of 26%.

The pre-sintered porous magnesia article was immersed in tetraethoxysilane to impregnate the porous magnesia article with 7.5 molar % of tetraethoxysilane (in terms of $SiO_2$).

The impregnated magnesia article was sintered at a temperature of 1400° C. for one hour to burn the tetraethoxysilane in the magnesia article.

The resultant sintered magnesia article exhibited the properties shown in Table 1.

COMPARATIVE EXAMPLE 4

The same magnesia particles having an average size of 0.055 μm as those described in Example 1 in an amount of 100 g were mixed with a solution of 40 ml of tetraethoxysilane in 100 ml of ethyl alcohol. The mixture was agitated for 3 hours, filtered, and then dried at a temperature of 105° C. for 48 hours. The dried mixture was milled in an agate mortar, and the milled mixture in an amount of 20 g was shaped and sintered in the same manner as that described in Example 1.

The resultant comparative sintered mixture exhibited the propertie as shown in Table 1.

EXAMPLE 2

The same procedures as those described in Example 1 were carried out except that the fluidizing gas stream further contained water vapor in an molar amount of 2 times the molar amount of the tetraethoxysilane.

The resultant sintered article exhibited the properties as indicated in Table 1.

TABLE 1

| Example No. | | Relative density (%) | Hydration resistance (%) | Bending strength (kg/cm$^2$) | Thermal conductivity (Cal/cm · sec · °C.) |
|---|---|---|---|---|---|
| Example | 1 | 99 | 0.01 | 2600 | 0.11 |
| Comparative | 1 | 98 | 0.98 | 2400 | 0.11 |
| Example | 2 | 85 | 0.80 | 1900 | 0.06 |
|  | 3 | 90 | 0.09 | 2300 | 0.07 |
|  | 4 | 88 | 0.04 | 2300 | 0.09 |

TABLE 1-continued

| Example No. | | Relative density (%) | Hydration resistance (%) | Bending strength (kg/cm$^2$) | Thermal conductivity (Cal/cm · sec · °C.) |
|---|---|---|---|---|---|
| Example | 2 | 99 | 0.01 | 2650 | 0.11 |

We claim:

1. A process for producing a shaped, sintered magnesia article having an enhanced resistance to hydration and an improved mechanical strength, comprising the steps of:

contacting fine magnesia particles with a vapor of an organic silicate compound at an elevated temperature to uniformly coat the surface of the fine magnesia particles with a silica coating layer containing organic substances in an amount not greater than about 0.01% in terms of carbon therein, based on the molar amount of silicon in the silica coating layer;

shaping the silica-coated fine magnesia particles into a predetermined shape of a precursory magnesia article; and sintering the resultant precursory magnesia article at an elevated temperature to an extent such that the silica coating layer is converted to a corresponding foresterite coating layer.

2. The process as claimed in claim 1, wherein the magnesia particles are prepared by oxidizing a vapor of metallic magnesium with a molecular oxygen-containing gas by a vapor phase oxidation reaction.

3. The process of claim 1, wherein the silica coating layer is formed in an amount of 0.1 to 10 molar % based on the molar amount of the silica-coated fine magnesia particle.

4. The process as claimed in claim 1, wherein the the fine magnesia particles are contacted with the organic silicate compound vapor by fluidizing the fine magnesia particles in a fluidizing gas stream containing the organic silicate compound vapor at a temperature of from 300° C. to 600° C.

5. The process as claimed in claim 4, wherein the organic silicate compound vapor in the fluidizing gas stream is in a concentration of 1 to 20 molar %.

6. The process as claimed in claim 4, wherein the fluidizing gas stream additionally contains water vapor in a molecular amount of 0.1 to 20 times the molar amount of the organic silicate compound.

7. The process as claimed in claim 1, wherein the silica coated fine magnesia particles are shaped at a pressure of at least 1 ton/cm$^2$.

8. The process as claimed in claim 1, wherein the precursory magnesia article is sintered at·a temperature of 1300° C. to 1700° C.

9. A process of claim 1, wherein the magnesia particles are contacted with the vapor of the organic silicate to compound at a temperature of from 300° C. to 600°· C.

10. A process of claim 9, wherein the temperature is from 350° C. to 450° C.

* * * * *